Patented Oct. 22, 1935

2,018,137

UNITED STATES PATENT OFFICE 2,018,137

CONDENSATION PRODUCTS FROM PHLOR-OGLUCINE AND PROCESS OF PREPARING THEM

Leopold Laska and Oskar Haller, Offenbach-on-the-Main, Germany, assignors to General Aniline Works, Inc., New York, N. Y., a corporation of Delaware No Drawing. Application March 31, 1934, Serial No. 718,520. In Germany April 8, 1933

7 Claims. (Cl. 260—109)

The present invention relates to condensation products from phloroglucine which still contain at least one hydroxy group of the phloroglucine nucleus and to a process of preparing them.

We have found that condensation products from phloroglucine which still contain at least one hydroxy group of the phloroglucine nucleus may be obtained with very good yields by heating phloroglucine with aromatic amines containing at least one nuclear substituent of the group consisting of hydroxy, carboxylic acid and sulfonic acid groups, in the presence of water and, if necessary, in the presence of acids or of alkali metal bisulfites. The condensation medium will be chosen so that it corresponds to the nature of the carboxylic acids or sulfonic acids of the amines and, as the case may be, it will be advantageous to effect the condensation in the presence of alkali metal bisulfites or acids. Whereas, according to the present invention, the amino group of the aromatic amine reacts with a hydroxyl group of the phloroglucine nucleus, with elimination of water, there occurs in the case of the known condensation of phloroglucine with ortho-amino benzylalcohol a reaction of the hydroxyl group of aminobenzylalcohol with a hydrogen atom of the phloroglucine nucleus, the amino group remaining unaltered (cf. Beilstein "Handbuch der organischen Chemie", 4th edit., vol. VI, page 1098, or "Monatshefte für Chemie", vol. 23, [1902] page 986).

The phloroglucine derivatives obtained according to this invention are valuable intermediates for the preparation of dyestuffs or other organic compounds. Those among them which are new products are characterized by the following general formula:

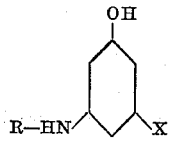

wherein X represents —OH or the group —NH—R and R stands for an aryl radical containing at least one nuclear substituent of the group consisting of hydroxy, carboxylic acid and sulfonic acid groups.

The following examples serve to illustrate the invention but they are not intended to limit it thereto. The parts are by weight:

1. 40.5 parts of phloroglucine (containing water of crystallization) and 61.5 parts of 1-methyl-2-amino-4-hydroxybenzene are heated in an enamelled autoclave for 6 hours at 130° C. After cooling, the reaction mass is dissolved in dilute caustic soda solution, filtered and acidified by means of hydrochloric acid, whereby the condensation product precipitates in the form of a deep yellow dihydrochloride. In order to further purify it, it is redissolved in dilute caustic soda solution after washing, filtered and precipitated by neutralization by means of dilute acetic acid. The condensation product thus obtained from 1 mol. of phloroglucine and 2 mols. of 1-methyl-2-amino-4-hydroxybenzene which corresponds with the following formula:

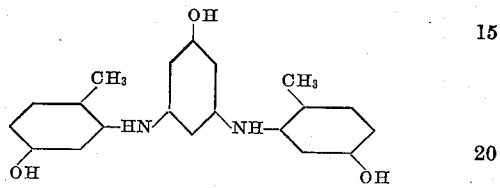

crystallizes from dilute alcohol and melts then at 115° C. The yield amounts to 80% of the theoretical.

2. 81 parts of phloroglucine (containing water of crystallization), 209 parts of sulfanilic acid (4-amino-benzene-1-sulfonic acid), 500 parts of sodium bisulfite solution (37.6% NaHSO$_3$) and 500 parts of water are heated to boiling in a reflux-apparatus for 50 hours. On cooling of the reaction liquid, the condensation product precipitates. It may be recrystallized from a small quantity of water and melts above 360° C. The analysis shows, that 2 mols. of sulfanilic acid have been condensed with 1 mol. of phloroglucine.

3. 81 parts of phloroglucine, containing water of crystallization, 137 parts of p-aminobenzoic acid and 500 parts of sodium-bisulfite solution (37.6% NaHSO$_3$) are heated to boiling in a reflux-apparatus for 50 hours. By acidifying the reaction mixture with hydrochloric acid, the condensation product precipitates in the form of a yellow hydrochloride. In order to further purify it, it is dissolved in a solution of sodium carbonate or sodium acetate and precipitated by addition of the theoretical amount of hydrochloric acid (so that no hydrochloride is formed). The 1,3,5-di-(4'-carboxyphenylamino)-hydroxybenzene, thus obtained, melts at 245° C. and gives in alcoholic solution a cherry-red coloration on the addition of a few drops of ferric chloride solution.

4. 81 parts of phloroglucine, containing water of crystallization, 109 parts of p-aminophenol and 500 parts of sodium bisulfite solution (37.6% NaHSO₃) are heated to boiling under reflux for 50 hours. By acidifying the reaction mixture with hydrochloric acid, the condensation product is obtained in the form of a dark yellow dihydrochloride. The free 1,3,5-di-(4'-hydroxyphenylamino)- hydroxybenzene is easily oxidizable.

5. 81 parts of phloroglucine, containing water of crystallization, 175 parts of the sodium salt of p-amino-salicylic acid, 500 parts of water and 500 parts of sodium-bisulfite solution (37.6% NaHSO₃) are heated to boiling in a reflux-apparatus for 50 hours. By addition of hydrochloric acid, the condensation product of the following constitution

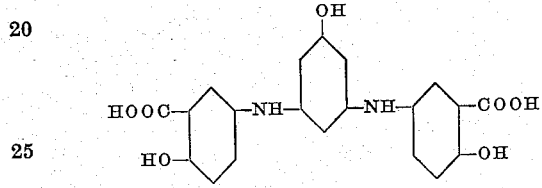

precipitates. It may be purified by redissolving in sodium carbonate solution and precipitating with the theoretical amount of hydrochloric acid. It melts at 255° C.

6. 81 parts of crystallized phloroglucine, 196 parts of 2,7-aminonaphthol-hydrochloride, 500 parts of water and 500 parts of sodium bisulfite solution (37.6% NaHSO₃) are heated to boiling in a reflux-apparatus for 50 hours. After cooling, the condensation product precipitates in the form of a grey precipitate, which is purified by dissolving in caustic alkali solution and adding hydrochloric acid until the alkali is neutralized whereby reprecipitation of the product takes place. The 1,3,5-di-(7'-hydroxynaphthyl-2'-amino)-hydroxybenzene of the following formula

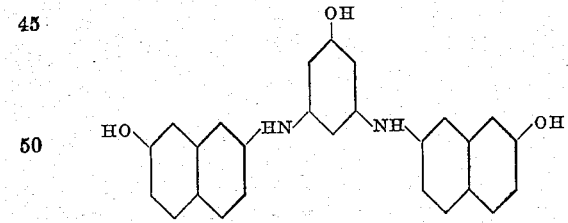

melts, after recrystallization from dilute alcohol, at 232° C. and forms with hydrochloric acid a yellow dihydrochloride.

In the same manner there may be obtained from phloroglucine and 2,3-amino-naphthol the corresponding condensation product which melts above 300° C. and which also forms with hydrochloric acid a yellow dihydrochloride.

7. 81 parts of a crystallized phloroglucine, 120 parts of 1-m-aminophenyl-3-methyl-5-pyrazolonehydrochloride, 500 parts of water and 500 parts of sodium bisulfite solution (37.6% NaHSO₃) are heated to boiling for 60 hours. The precipitate, which has separated after cooling, is filtered with suction and, for purification, converted into the hydrochloride and then again dissolved in caustic soda solution and reprecipitated. 1 mol of phloroglucine has been condensed with 1 mol of m-aminophenylmethylpyrazolone; the product which forms a brown powder, is not diazotizable. It, therefore, corresponds with the following formula:

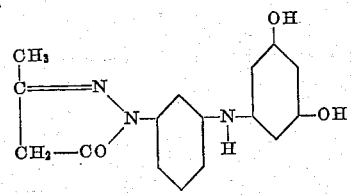

In the same manner the condensation of phloroglucine with p-aminophenylmethyl-pyrozolone may be conducted.

8. 40.5 parts of crystallized phloroglucine and 69 parts of p-aminobenzoic acid are heated to boiling in 500 parts of water for 50 hours. The condensation product precipitates, on cooling, and is purified by dissolving in sodium acetate solution and adding hydrochloric acid until neutralization takes place, whereby the product is reprecipitated. The analysis shows, that 1 mol. of phloroglucine has been condensed with 2 mols. of p-aminobenzoic acid. The product is identical to that of Example 3.

In the same manner the condensation of phoroglucine with m-aminobenzoic acid and para-aminophenol may be conducted. The products obtained are identical to those obtained in the presence of alkali metal bisulfites.

If phloroglucine is condensed with 2.5.7- or 2.8.6-aminonaphthol sulfonic acids or 1.8.3.6-aminonaphtholdi-sulfonic acid, condensation products are obtained which form with hydrochloric acid yellow hydrochlorides.

9. 40.5 parts of crystallized phloroglucine and 68.5 parts of anthranilic acid are heated to boiling in a reflux-apparatus in 500 parts of water with 57 parts of hydrochloric acid of 20° Bé. for 50 hours. After about 10 hours, precipitation of a yellow condensation product begins; when the reaction is finished, the product is filtered with suction, while hot, and washed. After drying, it is recrystallized from a large quantity of nitrobenzene or dichlorobenzene. The product obtained has no definite melting point and dissolves in cold concentrated sulfuric acid with yellow-green fluorescence. The product does not contain a free carboxylic acid group and has according to the analysis the following constitution:

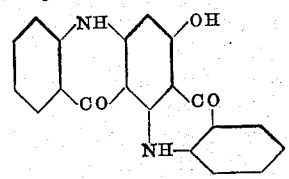

Accordingly there has occurred simultaneously with the condensation of the amino group of the anthranilic acid with phloroglucine a second condensation of the carboxylic acid group whereby ring closure takes place with the formation of an acridone. Such a reaction has already been described by Niementowski, "Berichte der deutchen chemischen Gesellschaft 29" (1896), page 76, and the product obtained by him has been designated as hydroxy-chinacridone; but it could not be foreseen, that under the mild conditions of reaction in accordance with the present invention condensation and formation of the acridone would take place even in an aqueous solution. The product obtained by the present process appears to be uniform and corresponds with the above indicated angular formula (cf. loc. cit.).

The same condensation product is obtained by condensing 1 mol. of phloroglucine with 2 mols. of anthranilic acid according to the bisulfite method.

10. 40.5 parts of phloroglucine are heated to boiling in a reflux-apparatus with 50 parts of 2,3-aminonaphthoic acid in 500 parts of water and 30 parts of hydrochloric acid of 20° Bé. for 30 hours. The orange-yellow precipitate which is formed, is filtered while hot, washed and, in order to purify it, dissolved in dilute caustic soda solution, filtered and precipitated by passing in carbon dioxide. The product obtained possesses no definite melting point and assumes a dark color at heating above 300° C. It has been formed by condensation of 1 mol. of phloroglucine with 1 mol. of 2,3-aminonaphthoic acid with simultaneous ring closure to the acridone and has the constitution:

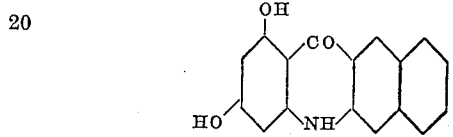

We claim:

1. The process of preparing condensation products from phloroglucine which still contain at least one hydroxy group of the phloroglucine nucleus which comprises heating in the presence of water phloroglucine with an aromatic amine of the group consisting of amines of the benzene and naphthalene series containing at least one nuclear substituent of the group consisting of hydroxy, carboxylic acid and sulfonic acid groups.

2. The process of preparing condensation products from phloroglucine which still contain at least one hydroxy group of the phloroglucine nucleus which comprises heating, in the presence of water and of an alkali metal bisulfite, phloroglucine with an aromatic amine of the group consisting of amines of the benzene and naphthalene series containing at least one nuclear substituent of the group consisting of hydroxy, carboxylic acid and sulfonic acid groups.

3. The compounds of the general formula:

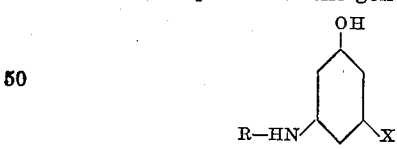

wherein X represents —OH or the group —NH—R and R stands for a radical of the benzene or naphthalene series containing at least one nuclear substituent of the group consisting of hydroxy, carboxylic acid and sulfonic acid groups, being gray to brown powders which form with hydrochloric acid yellow hydrochlorides.

4. The compounds of the general formula:

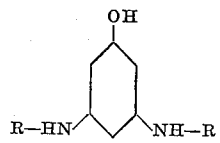

wherein R stands for a radical of the benzene series containing at least one nuclear substituent of the group consisting of hydroxy, carboxylic acid and sulfonic acid groups, being gray to brown powders which form with hydrochloric acid yellow hydrochlorides.

5. The compound of the following formula:

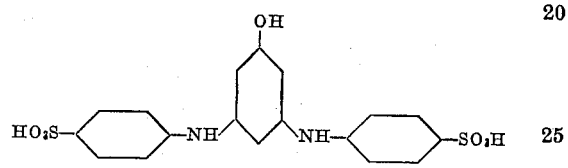

melting above 360° C. and forming with hydrochloric acid a yellow dihydrochloride.

6. The compound of the following formula:

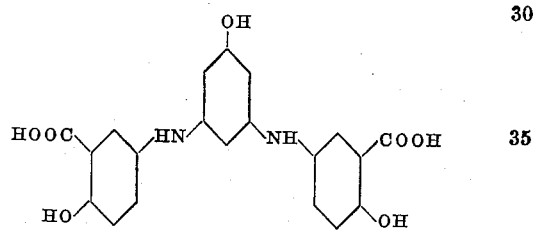

melting at 255° C. and forming with hydrochloric acid a yellow dihydrochloride.

7. The compound of the following formula:

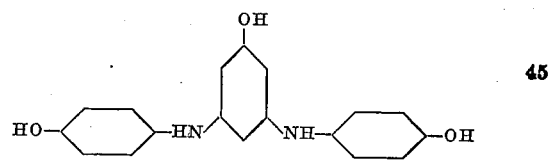

being easily oxidizable, forming with hydrochloric acid a dark yellow dihydrochloride.

LEOPOLD LASKA.
OSKAR HALLER.